United States Patent
Shao

[19]

[11] Patent Number: 5,897,889
[45] Date of Patent: Apr. 27, 1999

[54] MOLDING APPARATUS FOR MOLDING EDGE CARD CONNECTOR

[75] Inventor: Tsun Shen Shao, Taipei Hsien, Taiwan

[73] Assignee: Hon Hai Precision Ind. Co., Ltd., Taipei Hsien, Taiwan

[21] Appl. No.: 08/835,862

[22] Filed: Apr. 8, 1997

[30] Foreign Application Priority Data

Sep. 4, 1996 [TW] Taiwan ................................. 85205016

[51] Int. Cl.$^6$ .................................................. B29C 45/00
[52] U.S. Cl. .................................. 425/577; 425/DIG. 10; 425/DIG. 58
[58] Field of Search .................................. 425/577, 468, 425/DIG. 10, DIG. 58; 249/64, 63, 176

[56] References Cited

U.S. PATENT DOCUMENTS

| | | | |
|---|---|---|---|
| 3,384,335 | 5/1968 | Schwarz | 249/176 |
| 3,905,740 | 9/1975 | Lovejoy | 249/63 |
| 4,362,291 | 12/1982 | Fuke et al. | 249/63 |
| 4,936,762 | 6/1990 | Gaudreau et al. | 249/176 |
| 5,183,616 | 2/1993 | Hedrick | 249/176 |

*Primary Examiner*—Tim Heitbrink

[57] ABSTRACT

A molding apparatus for molding an edge card connector and an edge card connector, wherein the molding apparatus is composed of a male and female molding die. The male molding die has a middle protrusion and a plurality of first holding portions, and said female molding die has a plurality of core pins. When the integral molding apparatus is assembled to mold an edge card connector, each core pin is received securely in a corresponding first holding portion, for retaining each core pin in a straight manner without inclination via injection molding process, so that the formed edge card connector of which each passageway defines a through bore extending into and connected with central slot of housing.

9 Claims, 17 Drawing Sheets

MOLDING APPARATUS FOR MOLDING EDGE CARD CONNECTOR

BACKGROUND OF THE INVENTION

1. Field of the Invention

The invention relates particularly to a molding apparatus, which enable molding core pin therein to retain straight without inclination in the rejection molding process, for ensuring the properly forming of edge card connector.

2. The Prior Art

The conventional edge card connector 1, such as shown in FIGS. 1, 2 & 5, includes therein a elongated, insulated housing 2 provided with central slot 4 for receiving a inserted electrical card (not shown) from exterior, one pair of opposed guiding means 3 located respectively in two opposed ends of said insulated housing 2 for guiding said electrical card, and a plurality of passageways 5 in two rows, each extending through the opposed top and bottom sides 7, 8 of said housing 2 and connected laterally with central slot 4, for receiving corresponding contacts (not shown) therein.

In FIGS. 3 & 4, it is indicated that the molding die 10 includes a male molding die 11 and female molding die 12, for molding a conventional edge card connector as shows in FIGS. 1, 2 & 5. The male molding die 11 is provided with a middle protrusion 13 extending along a longitudinal axis of the molding die 10 as the inserting direction of molding dies 11, 12 with each other, so that it defines a T-shape of lateral cross-section thereof. The female molding die 12 is provided with a plurality of core pin 16 in two rows which extend along a longitudinal axis of the molding die 10 as the inserting direction of molding dies 11, 12 with each other, and said two rows of core pins 16 are further separated by a space 161 and each core pins 16 having a inward side 17 facing the space 161. For the male molding die 11 being assembled with female molding die 12 to configure a integral molding die 10 for use with injection molding process, such as shown in FIG. 4, the middle protrusion 13 of male molding die 11 is inserted into said space 161 separating two rows of core pins 16 of female molding die 12, until that the forward end 19 of each core pin 16 engages closely with bottom wall 111 of male molding die 11 and a clearance "a" forms in between the forward side 18 of middle protrusion 13 and bottom wall 121 of female molding die 12, as the cross-sectional view shown in FIG. 4, in accordance with IV—IV crossing line in FIG. 3. Wherein an inward sides 17 of each core pin 16 in two rows engage closely with the two opposed surface 14, 15 of middle protrusion 13, respectively. According to the mentioned above, it can be found in FIGS. 5, 6 & 7 that the central slot 4 of connector 10 is formed by said middle protrusion 13 of male molding die 11. Two rows of passageways 5 through the opposed side 7, 8 are formed by two rows of core pins 16 engaging closely with bottom wall 111 of male molding die 11, and each passageway 5 connected with central slot 4 is formed by inward side 17 of each core pin 16 engaging closely with the opposed surface 14, 15 of middle protrusion 13. The depth "a" of bottom side 8 of connector 1 is formed by the clearance "a" between the forward side 18 of middle protrusion 13 and bottom wall 121 of female molding die 12 The aforementioned as the cross-sectional views shown in FIGS. 6 & 7, in accordance with VI—VI, VII—VII crossing lines in FIG. 5.

However, in the injection molding process of conventional connector 1, some molding material injected speedily into the molding die 10 via compressing process, may directly impact some core pins 16 and result in core pins 16 being inclined with respect to the inserting direction of molding dies 11, 12 with each other, and since the core pins 16 of female molding die 12 each is an cantilever beam structure and only engages the surface 14, 15 of male molding die 11 without being latched in traversal direction as injecting direction of molding material, so that this will causes the dimensions of products being inaccurate or the molding die 11, 12 to be damaged due to mutual collision, in next the inserting and drawing motion of molding die 11 12.

For resolving the above disadvantages, an object of the invention is to provide a molding apparatus for ensuring the core pin retaining straight without inclination and edge card connector having accurate dimensions through the mutually inserting and drawing motions of molding dies in many times.

Another one object of the invention is to provide a molding apparatus for avoiding core pin being inclined to damage the molding die through the mutually inserting and drawing motions of molding dies in many times.

Another one object of the invention is further to provide an edge card connector in accordance with said molding apparatus, defining therein a plurality of through bores partially extending into and connected with central slot of connector.

SUMMARY OF THE INVENTION

According to an aspect of the invention, a molding apparatus includes a plurality of holding portions retaining respectively core pins for ensuring the core pin keeping in a straight manner without inclination, for edge card connector having accurate dimensions and for avoiding damaging molding die, even through the mutually inserting and drawing motions of molding dies in many times. The edge card connector in accordance with said molding apparatus, defines therein a plurality of through bores partially extending into and connected with central slot of connector.

DETAILED DESCRIPTION OF THE PREFERRED EMBODIMENTS

References will now be in detail to the preferred embodiments of the invention While the present invention has been described in with reference to the specific embodiments, the description is illustrative of the invention and is not to be construed as limiting the invention Various modifications to the present invention can be made to the preferred embodiments by those skilled in the art without departing from the true spirit and scope of the invention as defined by appended claims.

Figure 1:
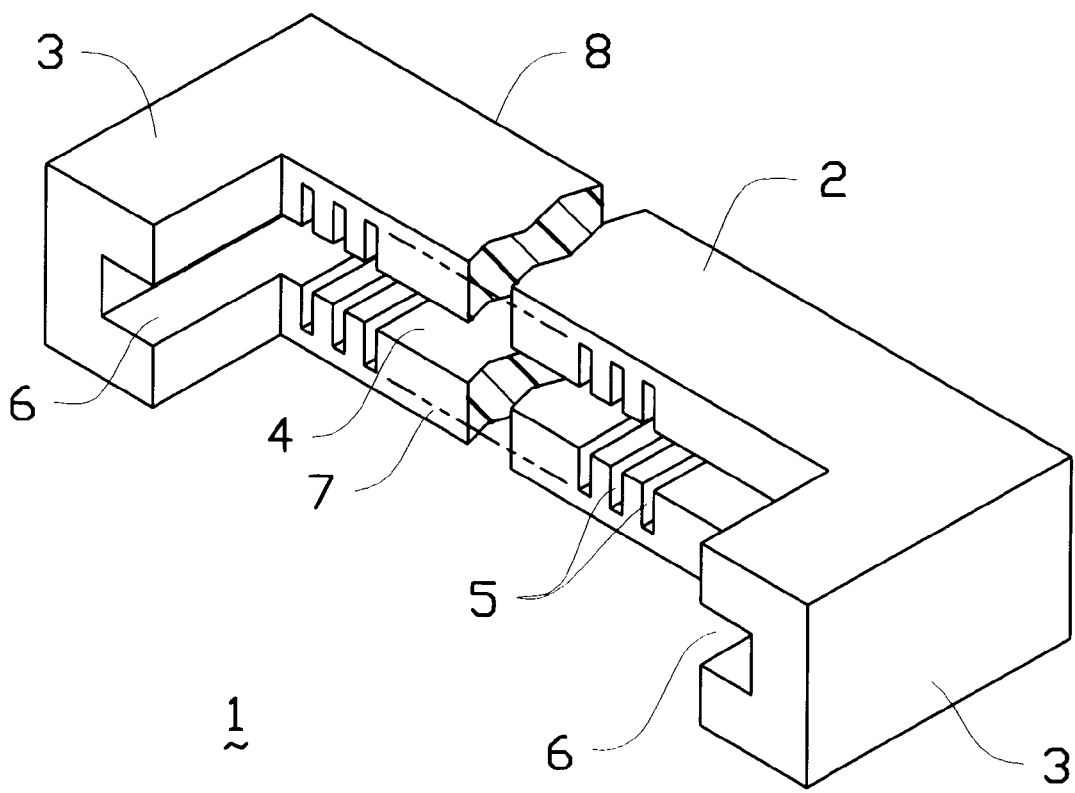
FIG. 1 is a partial perspective view of the conventional edge card connector that shows the top of said edge card connector.
Figure 2:
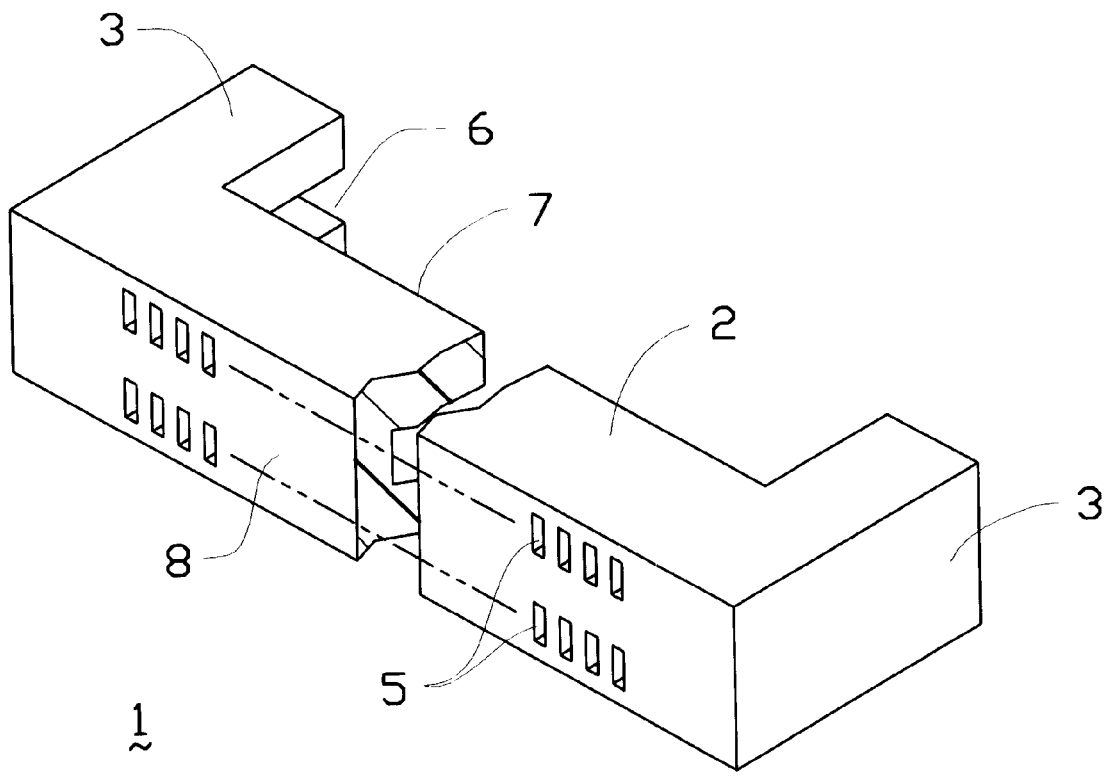
FIG. 2 is a partial perspective view of the conventional edge card connector in accordance with FIG. 1, that shows the bottom of said edge card connector.
Figure 3:
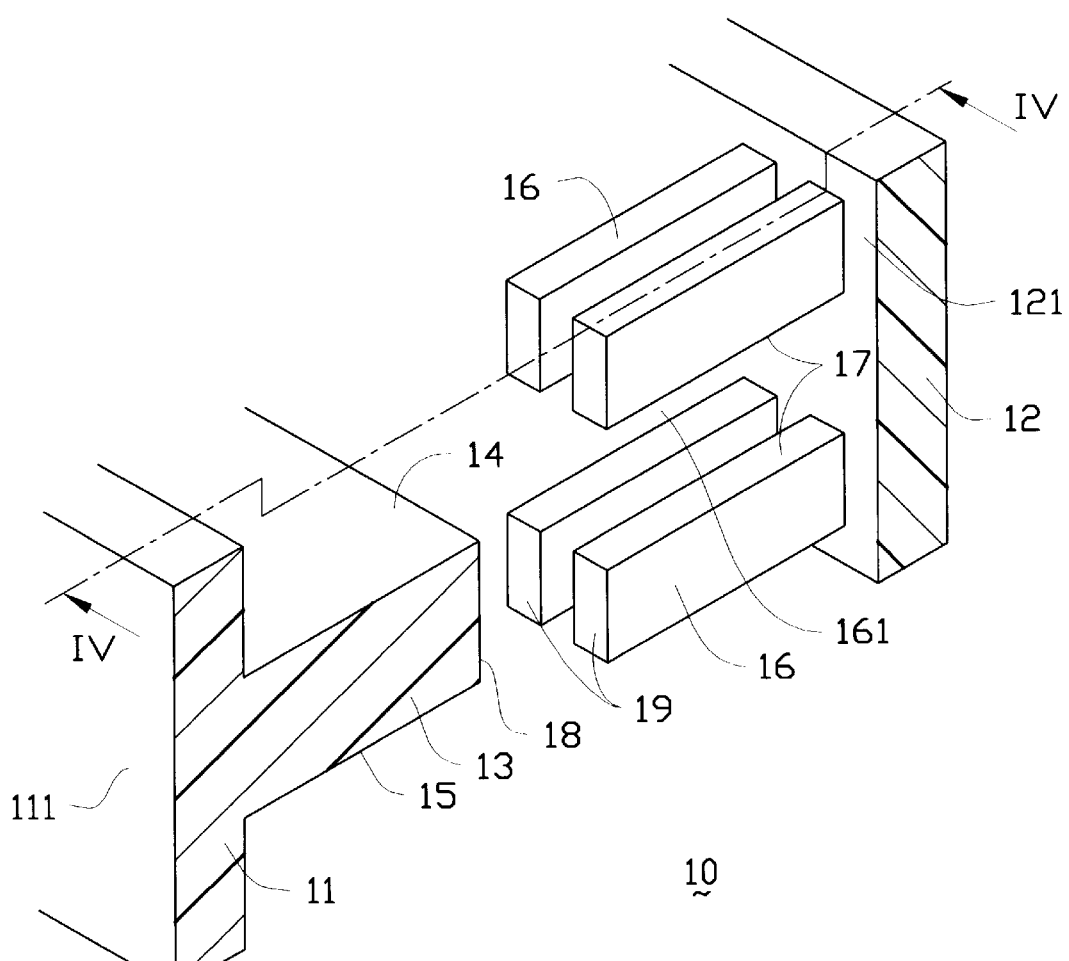
FIG. 3 is a partial perspective view of the molding die including male and female molding die, for molding the conventional connector as shown in FIG. 1.
Figure 4:
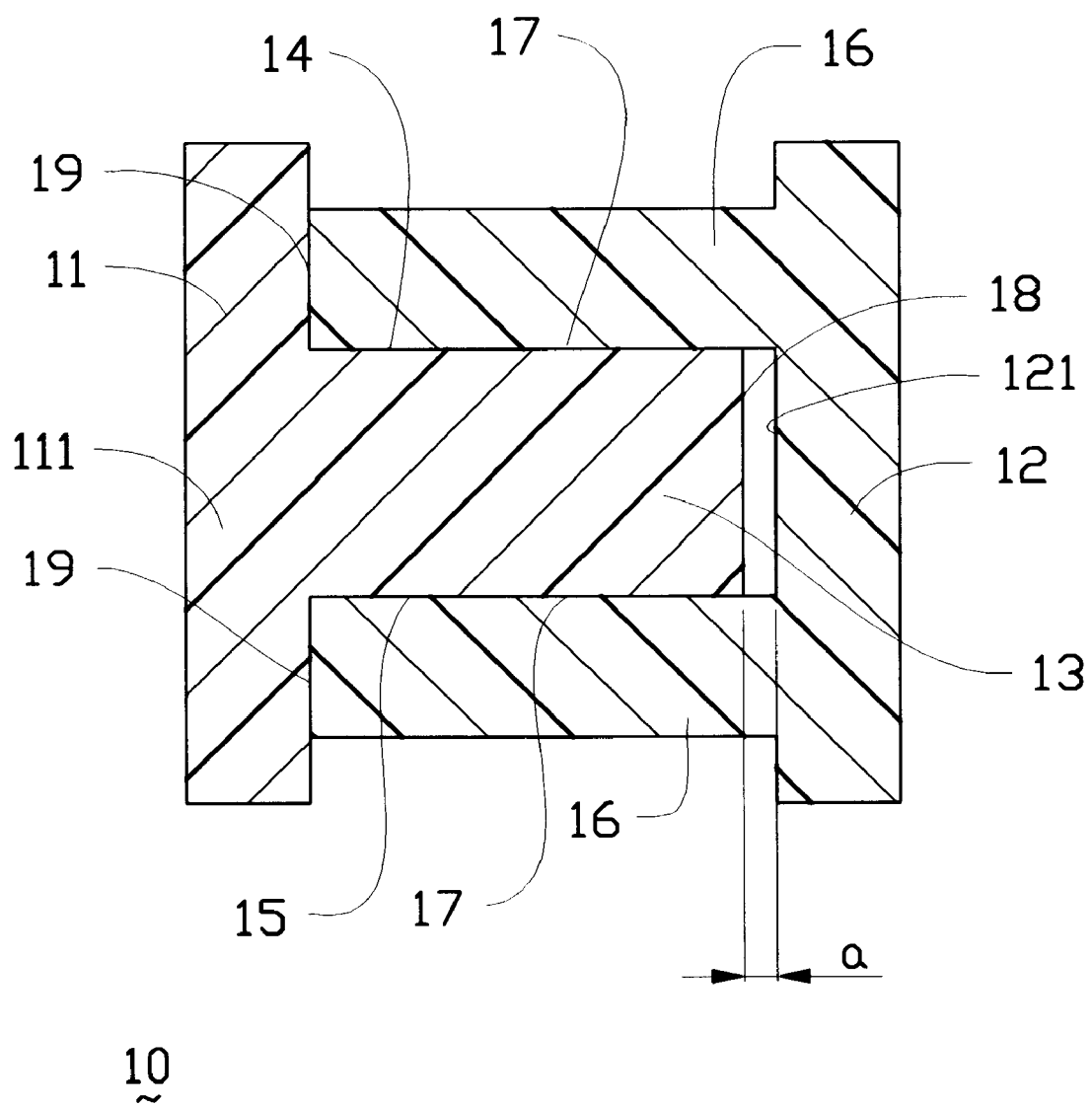
FIG. 4 is a cross-sectional view of the molding die in accordance with the crossing line IV—IV in FIG. 3.
Figure 5:
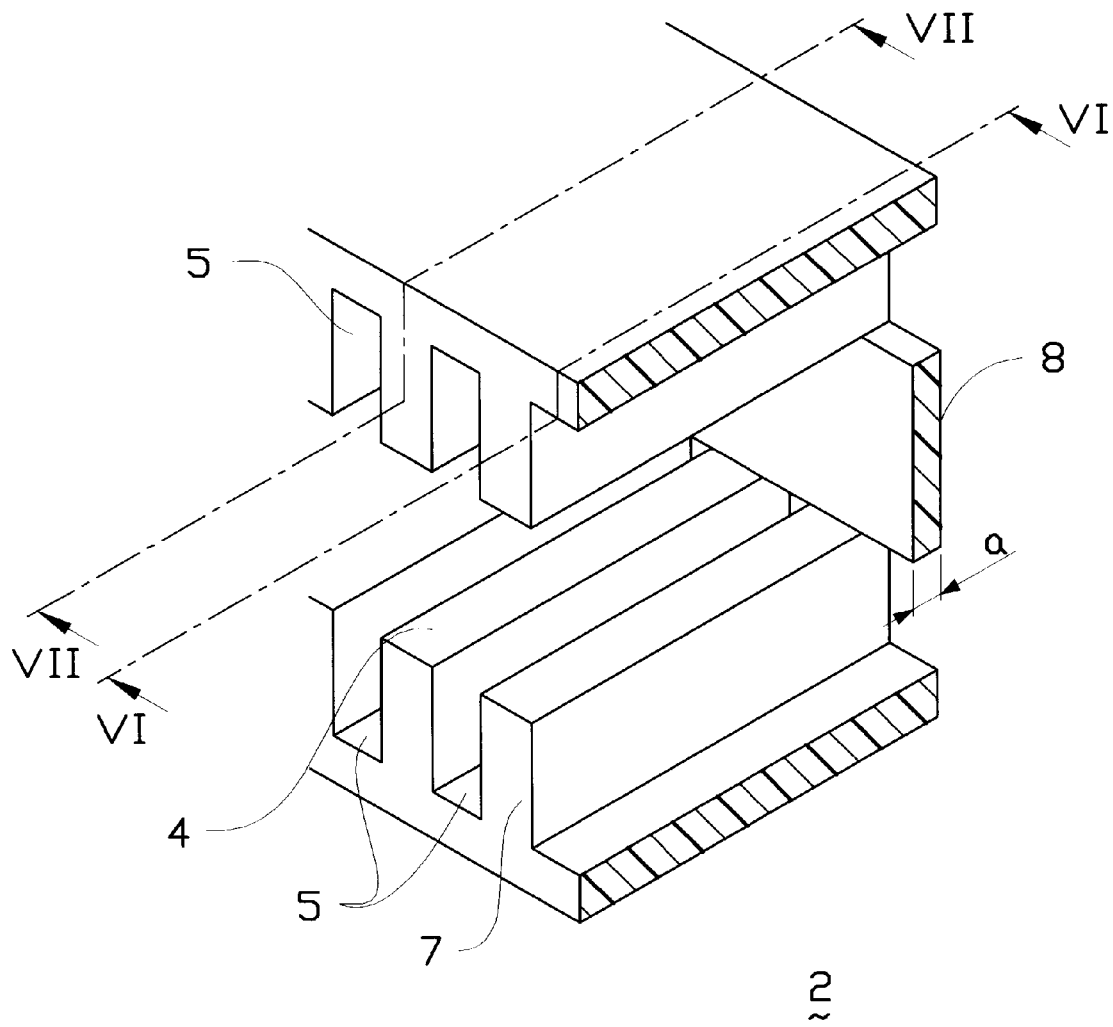
FIG. 5 is a perspective view of the conventional edge card connector in FIG. 1, having a cross-section along the traversal direction thereof.
Figure 6:
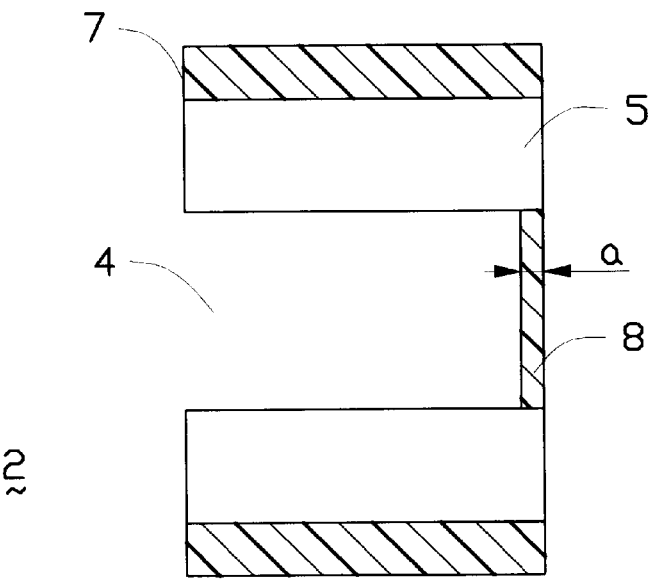
FIG. 6 is a cross-sectional view in accordance with the crossing line VI—VI in FIG. 5.
Figure 7:
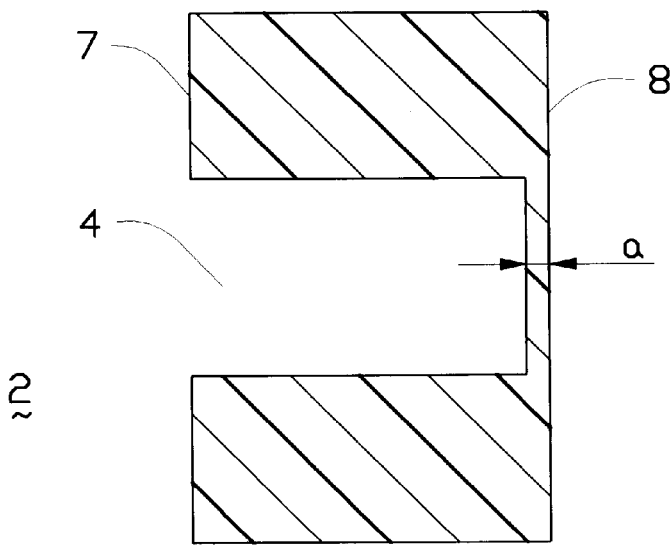
FIG. 7 is a cross-sectional view in accordance with the crossing line VII—VII in FIG. 5.
Figure 8:
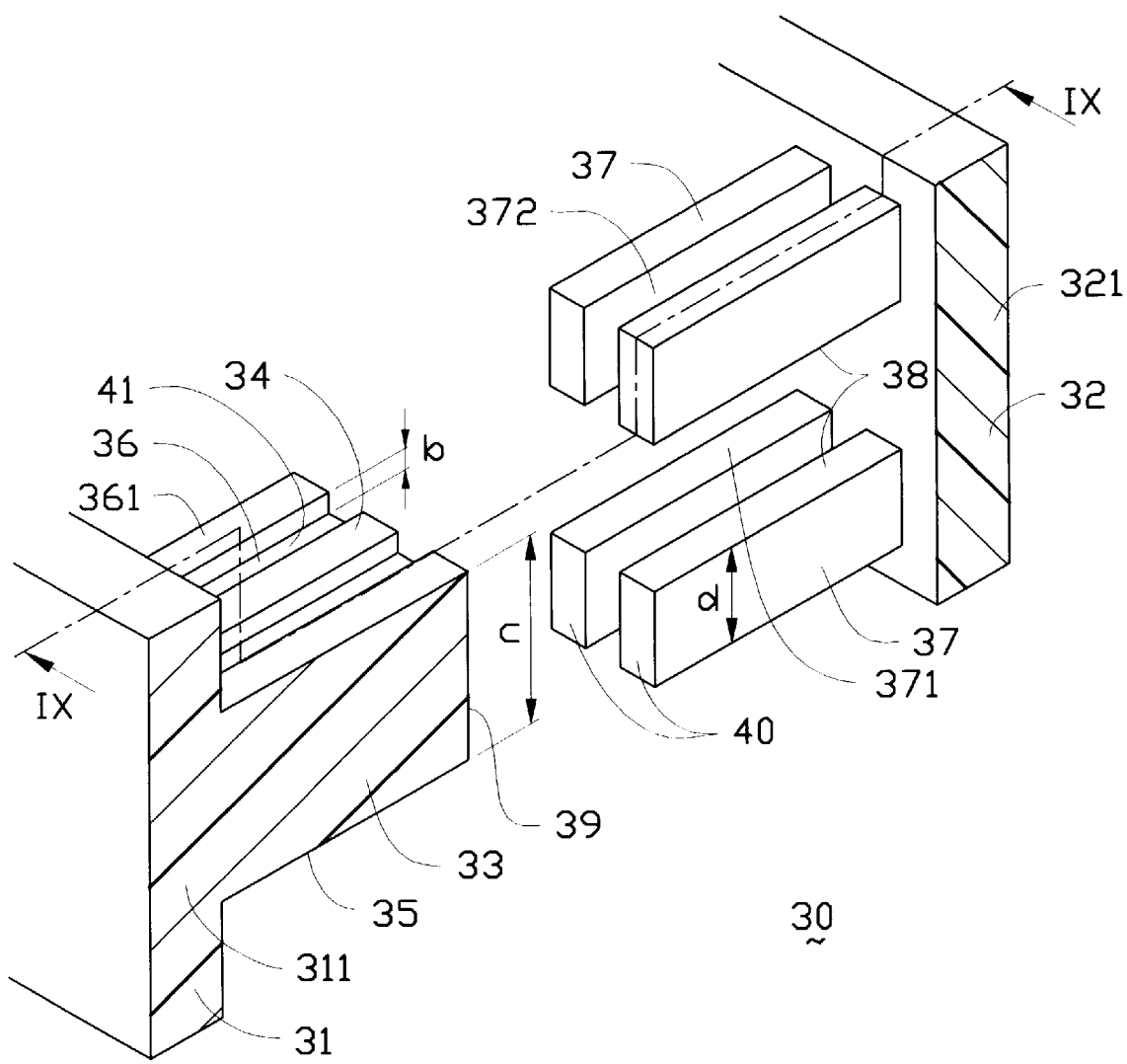
FIG. 8 is a partial respectively view of first embodiment of the present invention that indicates a molding apparatus including male and female molding die.
Figure 9:
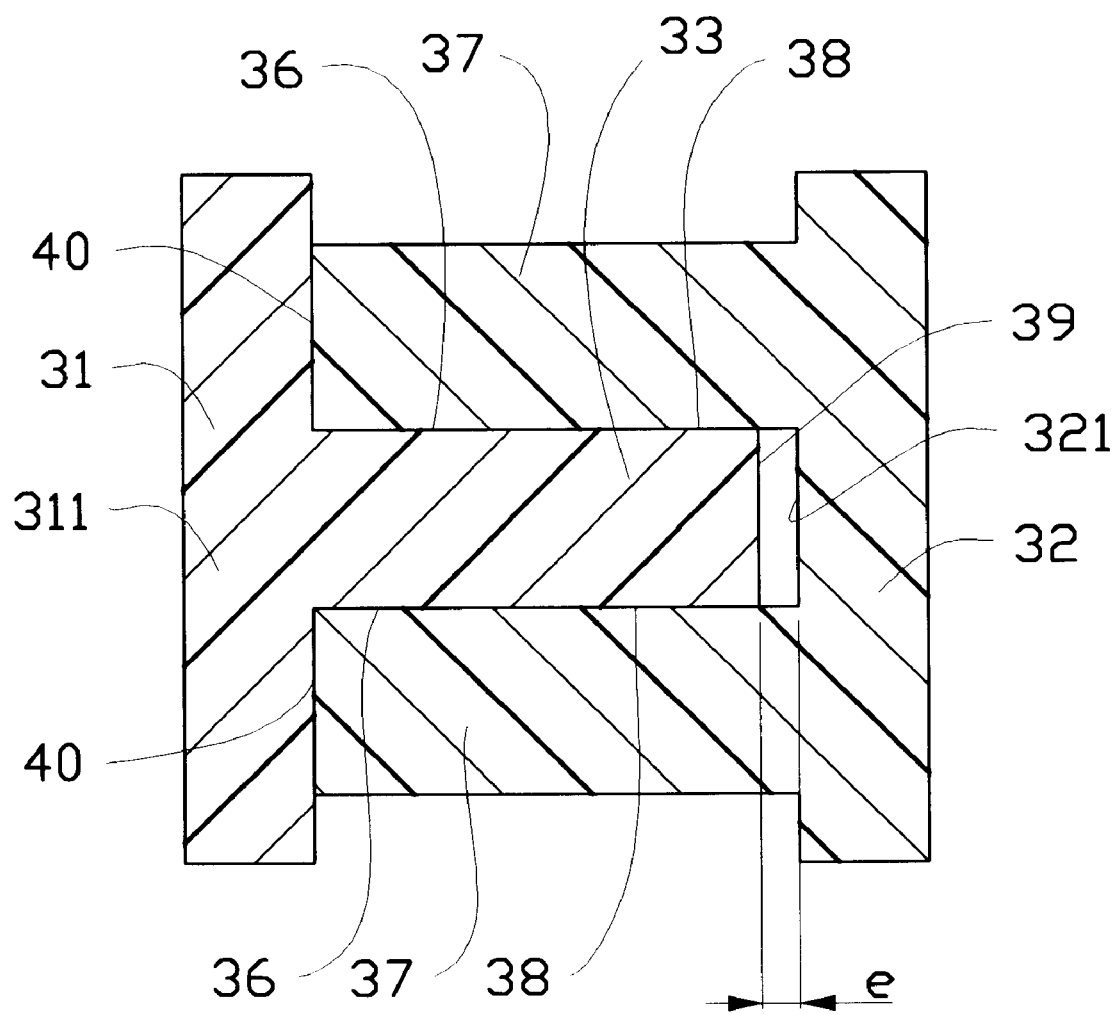
FIG. 9 is a cross-sectional view of the molding apparatus in accordance with the crossing line IX—IX in FIG. 8.
Figure 10:
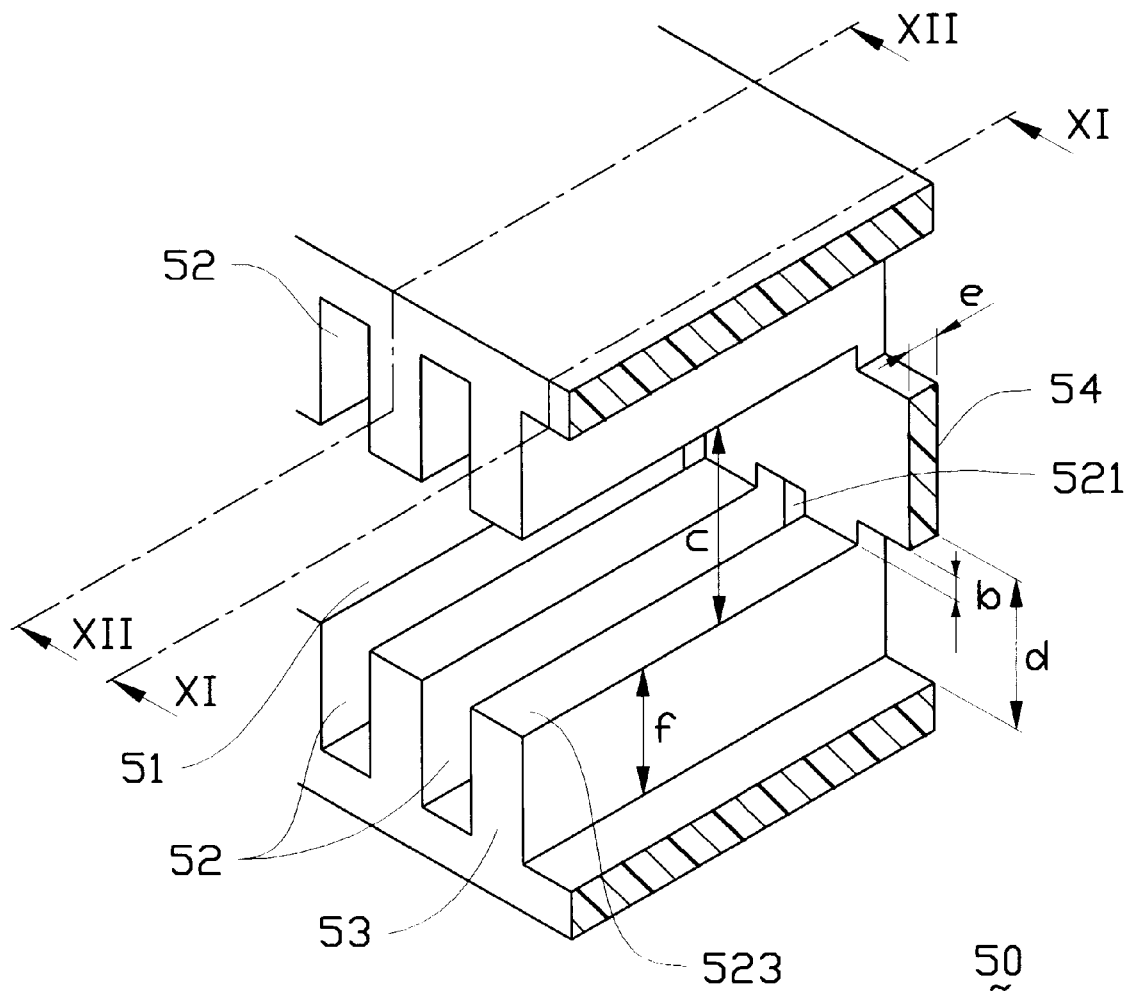
FIG. 10 is a perspective view of the edge card connector having a cross-section along the traversal direction thereof, in accordance with the molding apparatus as shown in FIG. 8.
Figure 11:
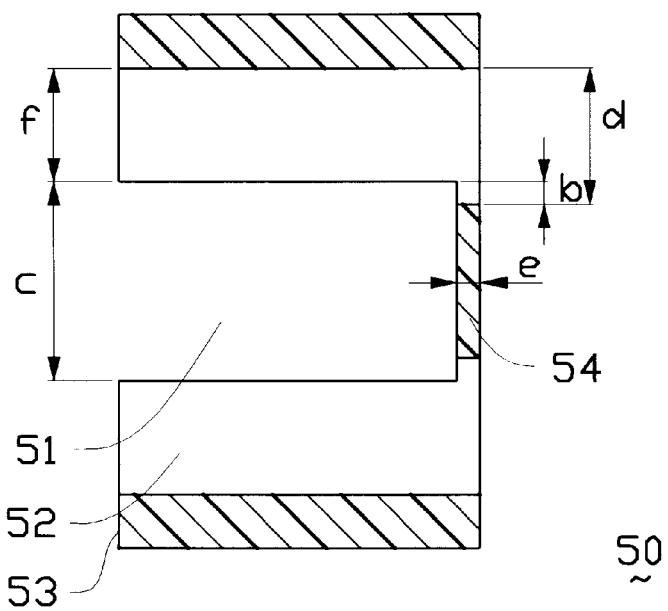
FIG. 11 is a cross-sectional view of the edge card connector in accordance with the crossing line XI—XI in FIG. 10.
Figure 12:
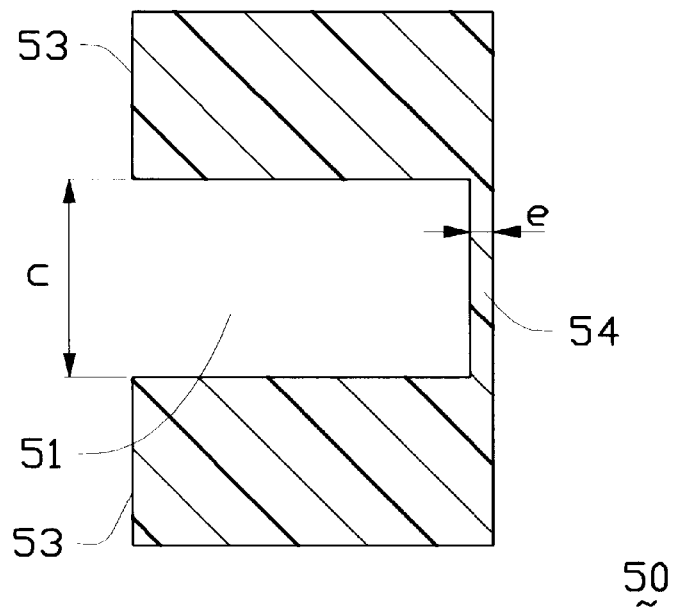
FIG. 12 is a cross-section view of the edge card connector accordance with the crossing line XII—XII in FIG. 10.
Figure 13:
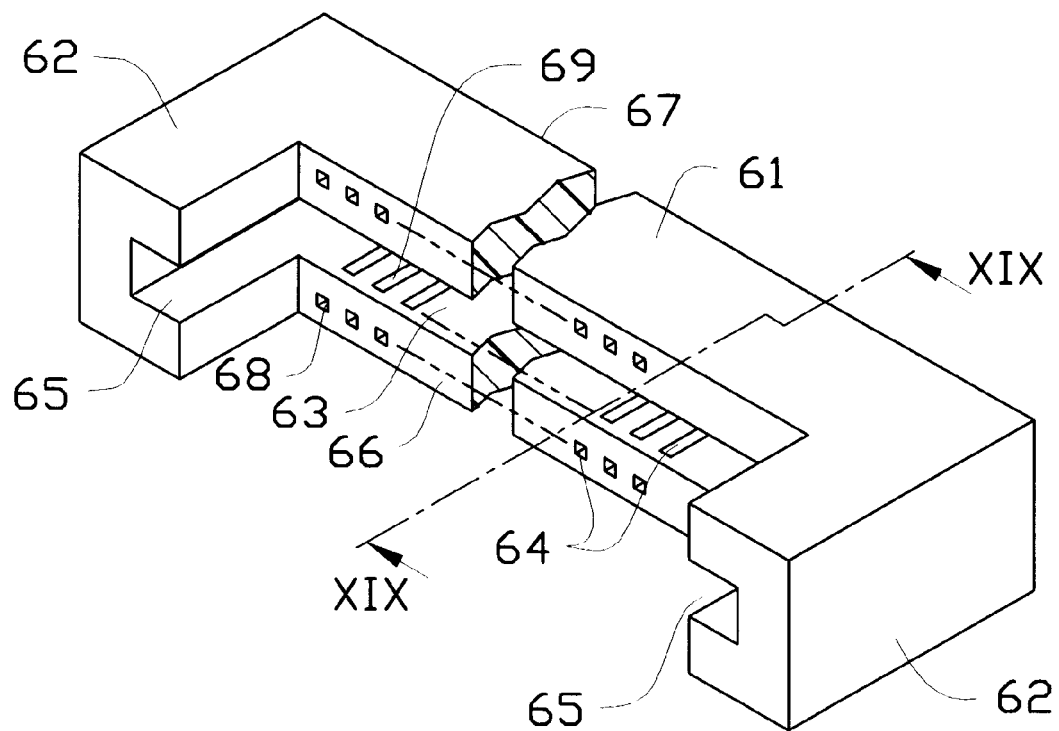
FIG. 13 is a partial perspective view of second embodiment present invention that shows the top of edge card connector.
Figure 14:
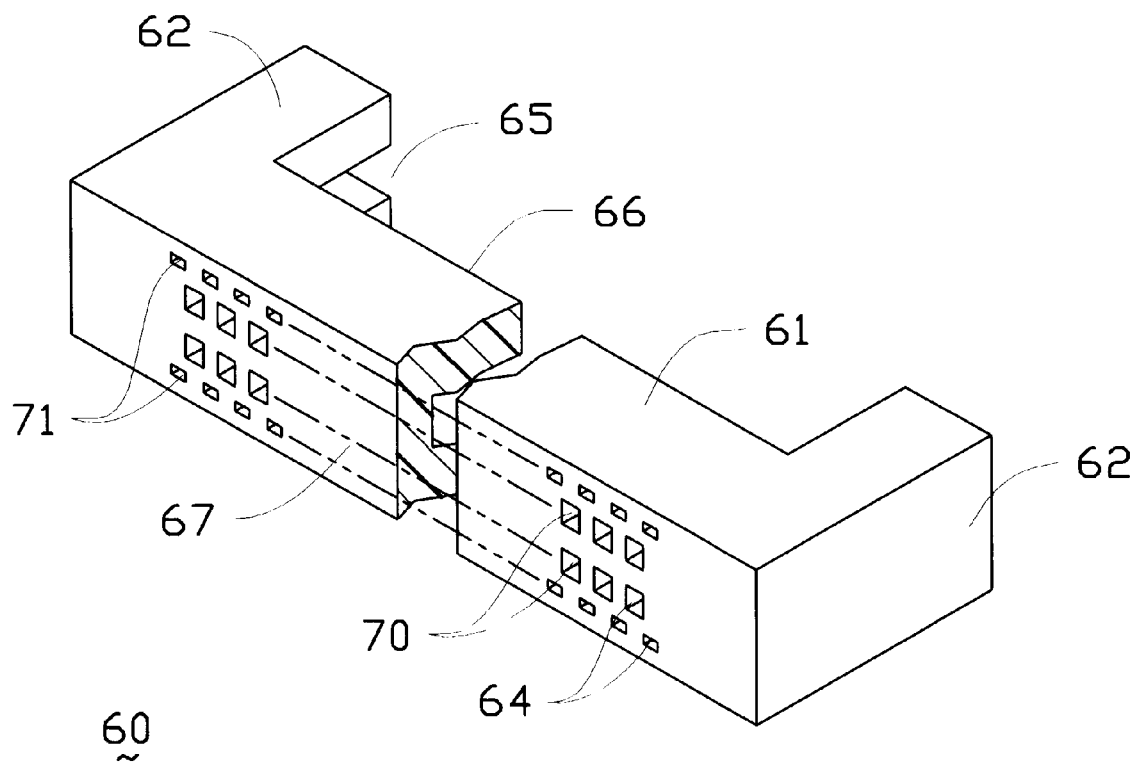
FIG. 14 is a partial perspective view of second embodiment of present invention in accordance with FIG. 13, that shows the bottom of edge card connector.

It will be noted here that for a better understanding, most of like components are designated by like reference numerals throughout the various figures in the embodiments. The first embodiment of the present invention will now be shown with reference to FIGS. 8–12. A molding apparatus 30 as shown FIGS. 8 and 9, is composed of a male molding die 31 and a female molding die 32. Wherein male molding die 31 is provided with a bottom wall 311, and a middle protrusion 33 having a width "c" and extending a length from said bottom wall 311; along a longitudinal direction as the mutually inserting direction of molding dies 31, 32 with each other, and a plurality of first holding portions 41 in two rows, formed respectively on two opposed surfaces 34, 35 of middle protrusion 33, and each two first holding portions 41 in one row defined a rib 361 in therebetween. Each first holding portions 41 further defines a groove structure of which the width is identical to that of each core pin 37, and which has contact surface 36 with regard to its two lateral ribs 361 to define a depth "b". Said female molding die 32 is provided with a bottom wall 321, and a plurality of core pins 37 in two rows which are separated by a first space 371 and in one row which are separated by a second space 372, wherein each core pin 37 has a width "d" and extends a length from said bottom wall 321 along a longitudinal direction as the mutually inserting direction of molding die 31, 32 and has an inward side 38 therein facing said first space 371. When the middle protrusion 33 of male molding die 31 is inserted into the space 371 of female molding die 32, for assembling the integral molding apparatus 30 as shown in FIG. 9, for molding edge card connector as shown in FIGS. 10–12, a forward end 40 of each core pin 37 can engage closely with bottom wall 311 of male molding die 31 and a clearance "e" forms in between forward side 39 of middle protrusion 33 and bottom wall 321 of female molding die 32, as the cross-sectional view shown in FIG. 9, in accordance with crossing line IX—IX in FIG. 8, and the inward side 38 of each core pin 37 is received partially in corresponding first holding portion 41 of male molding die 31 in a depth "b" and engages closely with contact surface 36 and two lateral side of surface 36 in first holding portion 41 for retaining each core pin 37 in a straight manner without inclination via injection molding process, and each rib 361 adjacent to said first holding portion 41 is received in second space 372 adjacent to said core pin 37 in a depth "b". According to the mentioned above, a edge card connector 50 is formed as shown in FIGS. 10–12, wherein a central slot 51 is formed by said middle protrusion 33 of male molding die 31 in a width "c". Two rows of passageways 52 through the opposed side 53, 54 of connector 50 are formed by two rows of core pins 37 engaging closely with bottom wall 311 of male molding die 31, and each passageway 52 connected with central slot 4, is formed by that inward side 38 of each core pin 37 is received within corresponding first holding portion 41 and engages closely with contact surface 36 in said first holding portion 41, and each passageway 52 adjacent to bottom side 54 defines a through bore 521 having a length "d" which is formed by the width "d" of each core pin 37, and each two passageways 52 define a interval block 523 therebetween extending a length "f" toward said central slot 51. The length "d" of said through bore 521 exceeding the length "f" of adjacent interval block 523 to extend into the central slot 51 in a length "b" which is formed by depth "b" of first holding portion 41. The depth "e" of bottom side 54 of connector 50 is formed by the clearance "e" between the forward side 39 of middle protrusion 33 and bottom wall 321 of female molding die 32, as the cross-section views shown in FIGS. 11 & 12, in accordance with crossing lines XI—XI, XII—XII in FIG. 10.

Figure 15:
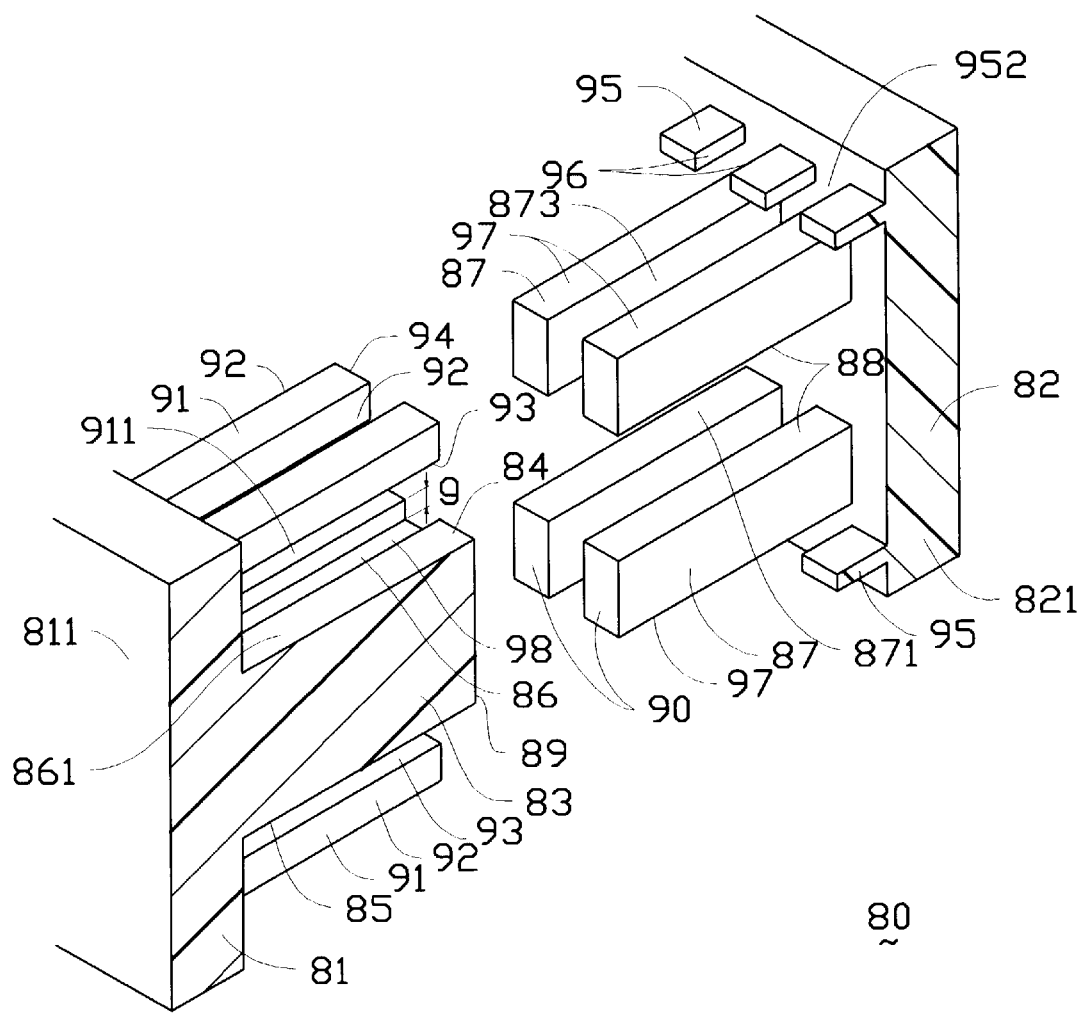
FIG. 15 is a partial respectively view of second embodiment of the present invention that indicates a molding apparatus including male and female molding die for molding said edge card connector in FIG. 19.
Figure 16:
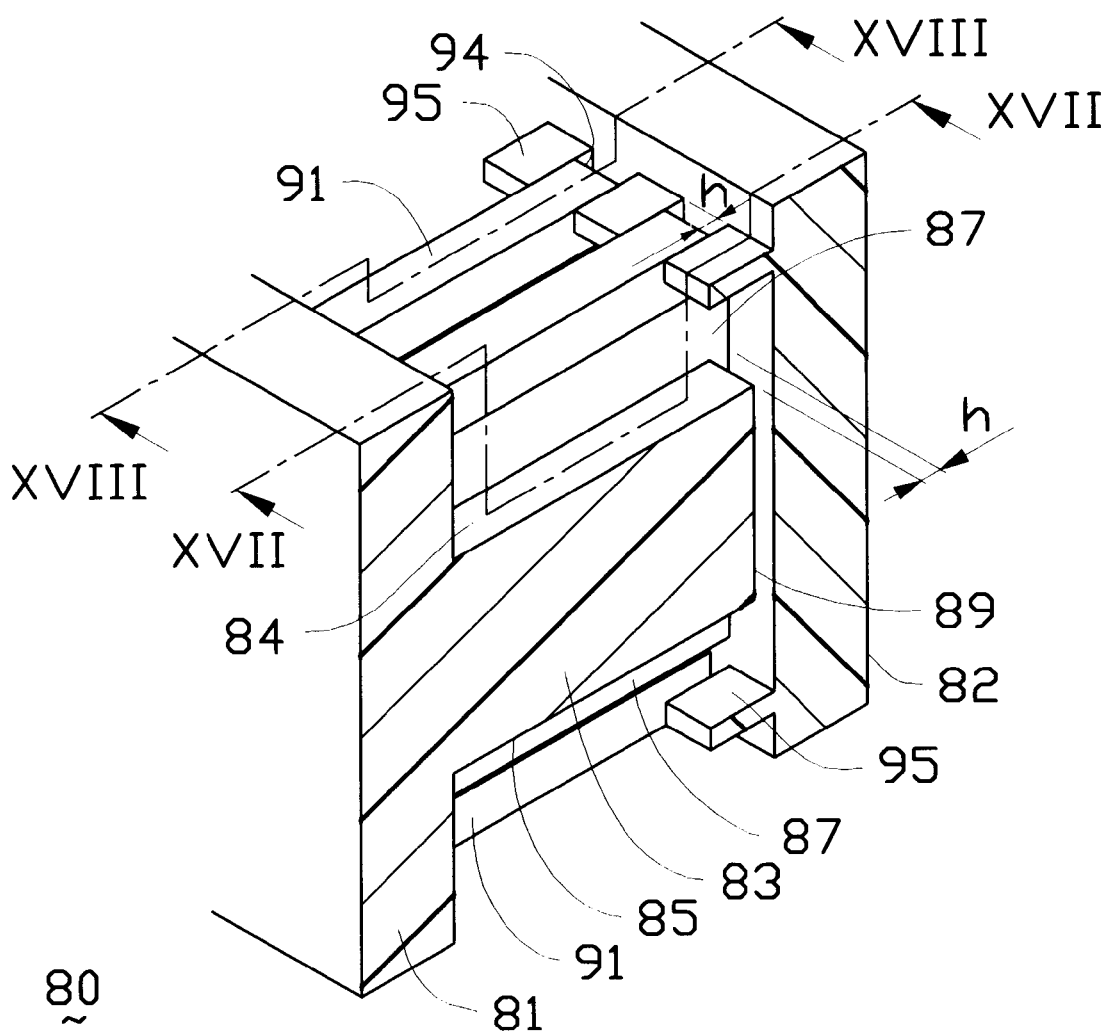
FIG. 16 is a partial respectively view of second embodiment of the present invention that shows the male molding die being inserted into female molding die in accordance with FIG. 15.
Figure 17:
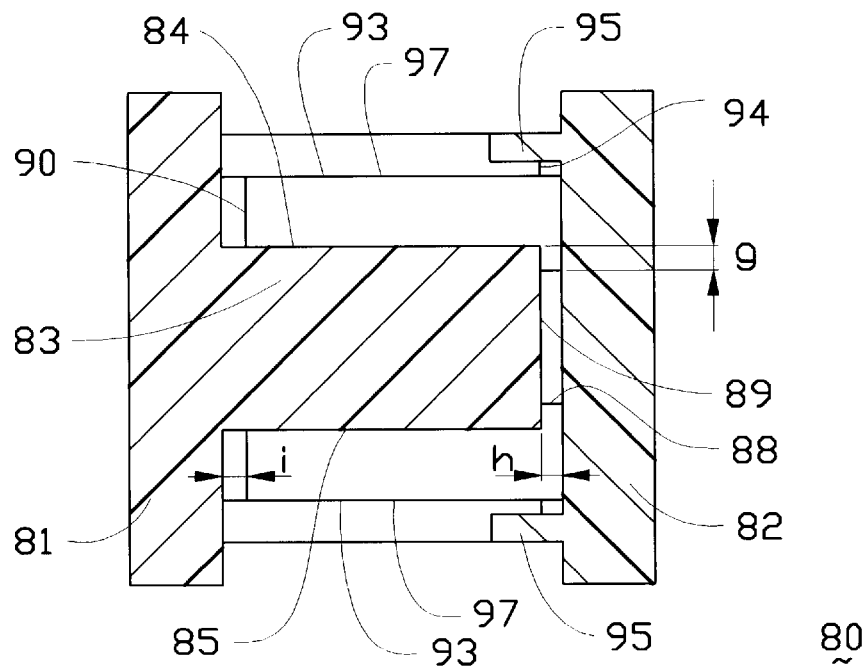
FIG. 17 is a cross-sectional view of second embodiment of the present invention along the crossing line XVII—XVII in FIG. 16.
Figure 18:
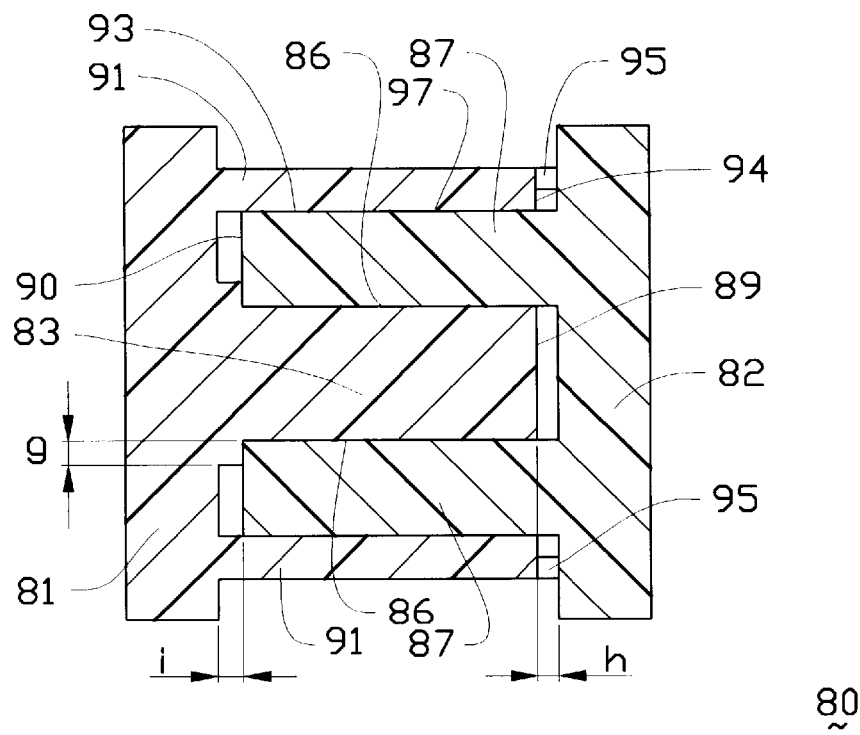
FIG. 18 is a cross-sectional view of second embodiment of the present invention along the crossing line XVIII—XVIII in FIG. 16.
Figure 19:
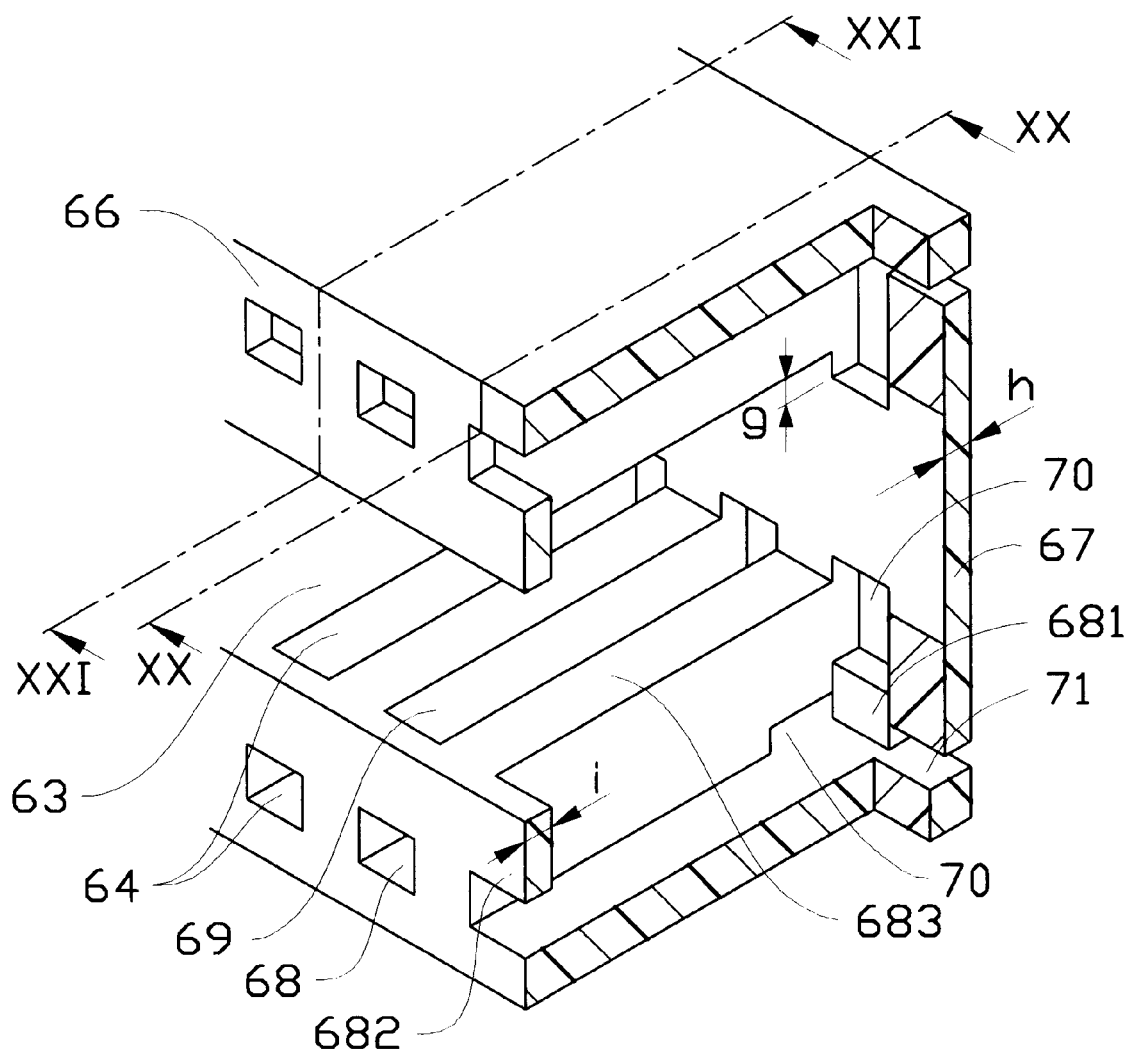
FIG. 19 is a perspective view of the edge card connector having a cross-section along the traversal direction thereof in accordance with the molding apparatus shown in FIG. 16.
Figure 20:
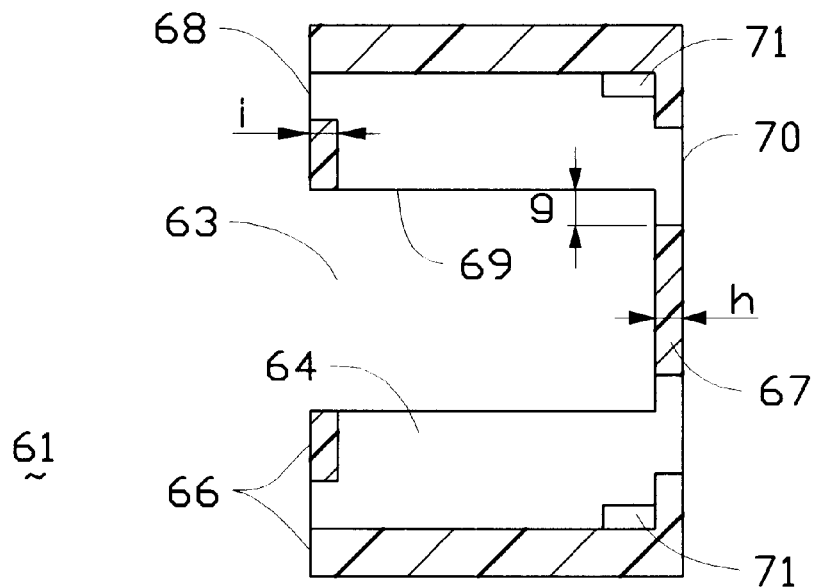
FIG. 20 is a cross-sectional view of second embodiment of the present invention along the crossing line XX—XX in FIG. 19.
Figure 21:
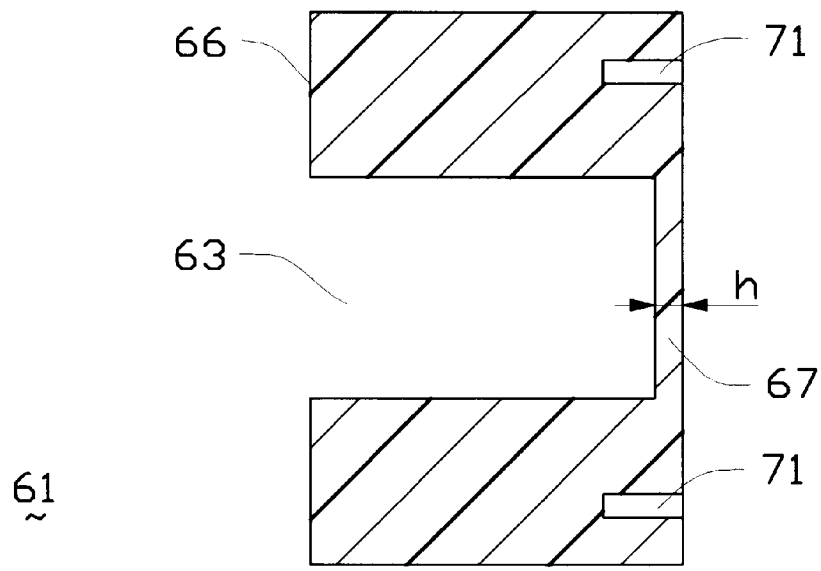
FIG. 21 is a cross-sectional view of second embodiment of the present invention along the crossing line XXI—XXI in FIG. 19.

Similarly, the second embodiment of the present invention will now be shown with reference to FIGS. 13–21. A molding apparatus 80 as shown FIGS. 15 and 16, is composed of a male molding die 81 and a female molding die 82. Wherein male molding die 81 is provided with a bottom wall 811, and a middle protrusion 83 extending a length from said bottom wall 311, along the mutually inserting direction of molding dies 81, 82, and a plurality of first holding portions 98 in two rows, formed respectively on two opposed surfaces 84, 85 of middle protrusion 83, and each two first holding portions 98 in one row defined a rib 861 in therebetween, and a plurality of second core pins 91 in two rows respectively facing corresponding first holding portion 98 in two side of said middle protrusion 83 and extending a length from bottom wall 811 toward said inserting direction wherein each second core pin 91 and middle protrusion 83 are separated by a fourth space 911. Each first holding portions 98 defines a groove structure of which the width is identical to that of each first core pin 37 of female molding die 82, and which has contact surface 86 with regard to two lateral ribs 861 to define a depth "g". Said female molding die 82 is provided with a bottom wall 821, and a plurality of first core pins 87 in two rows which are separated by a first space 871 and in one row which are separated by a second space 873, wherein each first core pin 87 extends a length from said bottom wall 821 along the mutually inserting direction of molding die 81, 82 and has an inward side 88 therein facing said first space 871, and a plurality of second holding portions 95 in two rows respectively extending a length from the two side of bottom wall 821 adjacent to said second core pins 87 wherein each two second holding portion 95 are separated by a third space 952. When the middle protrusion 83 of male molding die 81 is inserted into the first space 871 of female molding die 82 as shown in FIGS. 16–18 for assembling the molding apparatus 80 for molding edge card connector 61 as shown in FIGS. 19–21, a clearance "i" forms in between a forward end 90 of each first core pin 87 and bottom wall 811 of male molding die 81 as shown FIGS. 18 & 19, and a clearance "h" forms in between a forward side 89 of middle protrusion 83 and bottom wall 821 of female molding die 82 and between a forward end 94 of each second core pin 91 and bottom wall 821 of female molding die 82, as the cross-section view shown in FIGS. 16–18, and each first core pin 87 of which the inward side 88 is received partially in corresponding first holding portion 98 of male molding die 81 in a depth "g" and engages closely with contact surface 86 and two lateral side of surface 86 in first holding portion 98, and at same time, the first core pins 87 can be inserted into said fourth space 911 so that a top side 97 of each first core pin 87 engages closely with bottom side 93 of corresponding second core pin 91 for securely retaining each first core pin 87 in a straight manner without inclination via injection molding process, and each rib 861 adjacent to said first holding portion 98 is received in second space 872 adjacent to said first core pin 87 in a depth "g". Said second core pins 91 is inserted into the third space 952, so that two lateral sides 92 of second core pin 91 engage closely with lateral sides 96 of two adjacent second holding portion 95, for retaining said second core pins 91 in a straight manner without inclination via injection molding process. According to the mentioned above, a edge card connector 80 is formed as shown in FIGS. 19–21, wherein a central slot 63 is formed by said middle protrusion 83 of male molding die 81. Two rows of passageways 68 through the opposed side 66, 67 of connector 80 are formed by the close engagement between first and second core pins 87, 91, and each passageway 68 having an opening 69 connected with central slot 63, is formed by that inward side 88 of each first core pin 87 is received within corresponding first holding portion 95 in a depth "g" and engages closely with contact surface 86 in said first holding portion 98. Each passageway 68 adjacent to bottom surface 67 further defines a through bore 70 and first bridge 681 formed by the clearance "h" between the bottom wall 821 of female molding die 82 and forward end 94 of each second core pin 91, and each adjacent to the top surface 66 defines a second bridge 682 formed by the clearance "i" between forward end 90 of each first core pin 87 and the bottom wall 811 of male molding die 81, and each two passageways 68 further define a interval block 683 therebetween extending toward central slot 63 and formed by the second space 873 receiving the rib 861. The width of said through bore 70 exceeds that of two adjacent interval blocks 683 to extend into the central slot 63 in a length "g" which is formed by said depth "g" of first holding portion 98. The depth "h" of bottom surface 67 of connector 61 is formed by the clearance "h" between the forward side 89 of middle protrusion 83 and bottom wall 821 of female molding die 82. A blind hole 70 located in the bottom of each interval block 683 which is formed by corresponding second holding portion 95. The aforementioned as the cross-section views shown in FIGS. 21 & 22, in accordance with crossing lines XX—XX, XXI—XXI in FIG. 19.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. A molding apparatus for molding an electrical connector, comprising:

a male molding die forming thereon a middle protrusion and a plurality of first holding portions distributing opposed surfaces of said middle protrusion;

a female molding die arranged with a plurality of first core pins and a plurality of second holding portions adjacent to said first core pins;

whereby when the male and female molding dies are mutually inserted into each other in an injection molding process, the first holding portions are capable of retaining the corresponding first core pins in a straight manner without inclination in a first position wherein said male molding die is further provided with a plurality of second core pins which are capable of being retained by the corresponding second holding portions of said female molding die in a straight manner without inclination in a second position.

2. The molding apparatus as described in claim 1, wherein the total numbers of said first core pins is identical to that of first holding portions.

3. The molding apparatus as described in claim 1, wherein the total numbers of said first core pins are identical to that of second core pins.

4. The molding apparatus as described in claim 3, wherein each first core pin engages closely with a corresponding second core pin when male molding die is assembled with female molding die.

5. The molding apparatus as described in claim 1, wherein the second core pins of male molding die are located adjacent to said middle protrusion for respectively facing the corresponding first holding portions thereon.

6. The molding apparatus as described in claim 1, wherein each first holding portion of the male molding die defines a groove of which width is identical to that of a corresponding first core pin of the female molding die for reception thereof.

7. The molding apparatus as described in claim 1, wherein each two adjacent second holding portions of the female molding die are separated by a space for reception of an inserted second core pin of the male molding die therein.

8. A molding apparatus for molding an electrical connector with a housing, comprising:

a male molding die having a first bottom wall, a middle protrusion integrally extending from said first bottom wall, and a plurality of first holding portions which are defied with a plurality of grooves on opposed surfaces of said middle protrusion;

a female molding die having a second bottom wall opposite to the first bottom wall of the male molding die, and a plurality of first core pins extending from said second bottom wall for molding a plurality of holes of the housing of the connector;

whereby when the male and female molding dies are oppositely inserted into each other in an injection molding process, the first core pins of the female molding die are capable of being respectively received within the corresponding grooves of the first holding portions of the male molding die to retain the corresponding first core pins in a straight manner without inclination.

9. The molding apparatus as described in claim 8, wherein each groove consists of a contact surface and two opposed lateral sides of said surface thereby closely engaging the corresponding first core pin.

* * * * *